Sept. 27, 1938. H. SMITH 2,131,693
PROJECTION APPARATUS
Filed March 18, 1937
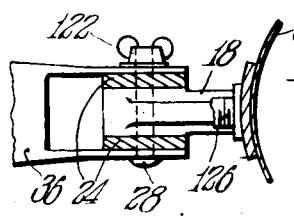
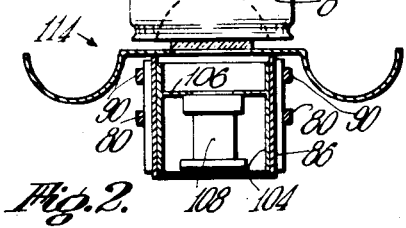
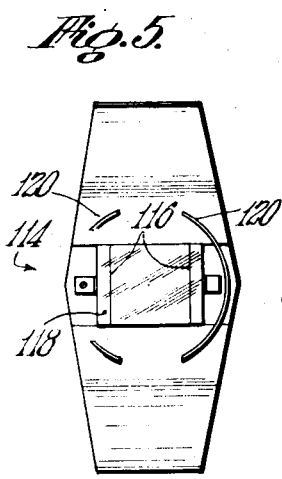
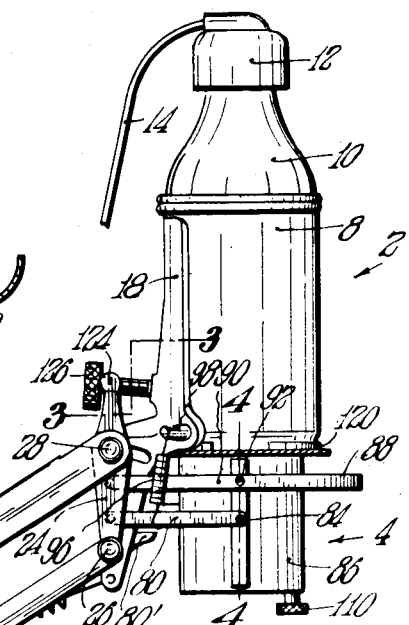
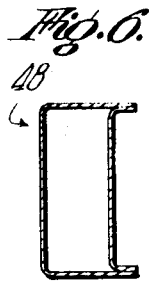
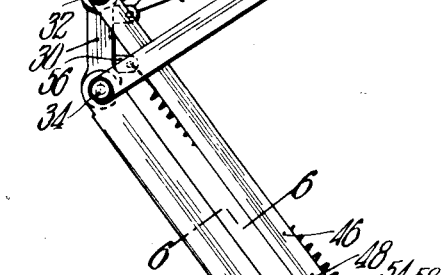
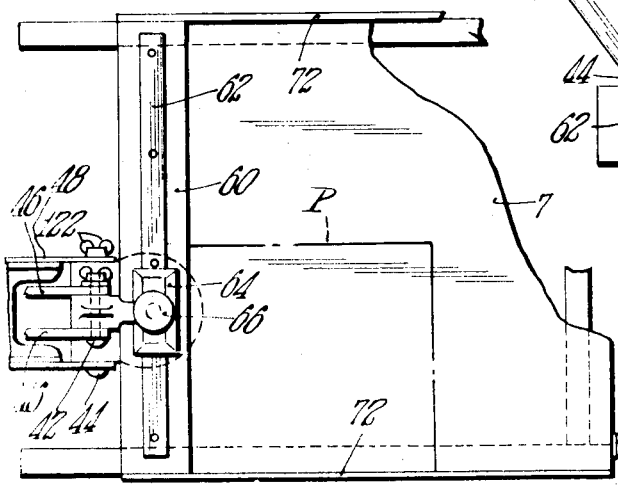
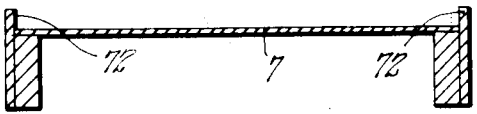
INVENTOR.
BY Hinsdale Smith
Walter C. Ross
ATTORNEY.

Patented Sept. 27, 1938

2,131,693

UNITED STATES PATENT OFFICE 2,131,693

PROJECTION APPARATUS

Hinsdale Smith, Springfield, Mass., assignor to Hinsdale Smith, Jr., New York, N. Y.

Application March 18, 1937, Serial No. 131,613

4 Claims. (Cl. 88—24)

This invention relates to improvements in projection apparatus and while the novel features of the invention will be described with reference to one particular form of the invention whereby enlargements of relatively smaller objects, such as negatives, may be made, it is not intended that the invention be limited thereto.

The invention is characterized by its simplicity in form and ease and efficiency in operation which is brought about by a novel combination and arrangement of parts all as will hereinafter more fully appear.

Various novel features and advantages of the invention will be hereinafter more fully referred to in connection with the accompanying description of the present preferred form of the invention, reference being had to the accompanying drawing wherein:

Fig. 1 is a side elevational view of a projection apparatus embodying the novel features of the invention;

Fig. 2 is a detail elevational view of the lamp house bracket of the apparatus shown in Fig. 1;

Fig. 3 is a sectional plan view on the line 3—3 of Fig. 1;

Fig. 4 is a sectional elevational view on the line 4—4 of Fig. 1 showing the film and lens support in section and the lamp house in full lines;

Fig. 5 is a plan view of the object supporting member of the apparatus shown in Fig. 1;

Fig. 6 is a sectional view on the line 6—6 of Fig. 1;

Fig. 7 is a plan view of the easel of the apparatus shown in Fig. 1; and

Fig. 8 is a transverse sectional view through the easel shown in Fig. 7.

Referring now to the drawing more in detail the invention will be fully described.

In a general way the apparatus of the invention includes a lamp house 2, a lens carrier mechanism 4, between which is clamped an object such as a negative, and an easel for supporting a part onto which the object in enlarged form is to be projected, the said lamp house and easel is relatively movable by novel means to be described.

The lamp house 2 includes a casing 8 having a closure 10 and a cap 12. In the cap 12 or closure there is mounted in some suitable manner a socket for an electric bulb and a cord for the socket extends into the said cap 12. The cap and closure are arranged for ventilation and are light tight. A condenser lens such as 16 or other light direction or diffusing means is associated with the casing 8 and against which an object is clamped.

A bracket member 18 is secured to the casing 8 and this as shown in Fig. 2 has a lower part 18' provided with a journal 20 and an upper slot 22 concentrically disposed relative to the journal 20. A link having side parts such as 24 at either side of the bracket part 18' shown in Fig. 2 has lower and upper journals in alignment with those of the bracket part 18'. Pivot members 26 and 28 are disposed in the openings of the parts 18' and 24. An intermediate bracket or link 30 is provided which carries upper and lower pivot members 32 and 34. An upper link or connector 36 is pivoted at opposite ends on the pivots 28 and 32. Lower links 38 are pivoted on the pivots 26 and 34.

A lower supporting member or bracket 40 carries pivots 42 and 44. Upper links 46 are pivoted on pivots 32 and 42 and a lower link 48 is pivoted on pivots 34 and 44. The links 36 and 46 are preferably made from sheet metal and as shown in Fig. 6 are more or less box-like in cross section so as to be rigid and strong for the purpose intended. There are preferably two links 38 and two links 46 disposed adjacent the outer sides of the links 36 and 48.

A tension spring 50 is connected to a lug 52 on the intermediate bracket 30 and to the lower end of bracket part 18' and a tension spring 54 is connected to a lug 56 on intermediate bracket 30 and to a lug 58 on bracket 40.

By means of the connections shown and described the lamp house may be moved up and down with reference to the bracket 40 and easel 6 and back and forth in planes at right angles to its path of movement up and down. The pivots 26, 28, 32, 34, 42 and 44 are preferably in the form of bolts having wing nuts such as 122 for clamping the parts more or less to function with a frictional action which together with springs 50 and 54 serves to facilitate easy movements of the parts for positioning and holding the lamp house in any desired position.

The easel 6 has a rail 60 on which is a guide 62. A block 64 is slidable along the guide 62 and a clamp screw 66 is provided which is in threaded engagement with the lug 68 of bracket 40 and in pivotal relation with respect to block 64. A foot or plate 70 carried by the bracket 40 underlies the rail 60 of the easel 6. As the screw 66 is tightened the bracket 40 is clamped in various positions of adjustment along the rail yet the construction is such that the bracket 40 and consequently the parts supported thereby may be swung relative to the easel. Not only is the bracket slidable transversely of the easel but it is swingable all to the end that the lamp house may not only be swung up and down and back and forth relative to the easel but it is swingable in planes substantially parallel to that of the easel.

It is possible to locate the lamp house and the image of the object to be projected on any desired part of the easel. A plate 7 is associated with the easel on which may be placed a sheet of paper or the like.

Guides 72 on the easel and the part 60 cooperate so that paper or the like on which the object is to be projected may be located. A sheet of paper or the like may be conveniently located on the member by abutting adjacent side edges against guides 72 and part 60 as indicated by P in Fig. 2.

Links 80 one at either side of bracket part 18' are pivoted at 82 to said bracket part 18' and at 84 to a tube 86. A bale member 88 extends around the member 86 and has side parts 90 pivoted at 92 to tube 86 and ends that are pivoted at 94 to bracket part 18'. A tension spring 96 is connected at one end to link 80 and at its other end to a lug 98 of bracket 18. Preferably there is a spring at either side of the apparatus and these tend to urge the tube 86 upwardly and resist downward movements thereof.

Bracket part 18' is provided with a stop 80' against which a stop 102 of the tube 86 abuts. The stops limit the downward movement of the tube 86. An inner tube 104 is slidable up and down in the tube 86 and this may have an end wall 106 with which may be associated a suitable projection lens and its mount indicated by 108. Suitable means may be provided for moving the inner tube and lens mount up and down for the purpose of focusing and this may be accomplished by a screw member indicated generally by 110. Another means would be the rod or pin on the inner tube 104 which extends through an angularly disposed slot in the outer tube 86.

An object support 114 shown in plan in Fig. 5 is provided and has an opening 116 therethrough over which is a transparent member such as a glass plate 118. A retainer or retainers 120 on the object support 114 are provided which are adapted to encircle the lower end of the casing 8. The glass member 118 of the object support is adapted to normally abut the under side of the condenser lens in the lamp house and the said supporting member is insertable between and removable from between the tube 86 and lamp house.

Ears 124 extending upwardly from the parts 24 receive therebetween an adjusting screw 126 which is in threaded engagement with the bracket 18 of the lamp house. By rotating the screw 126 the lamp house and its associated parts may be tilted from the position shown in Fig. 1 which is desirable in many instances.

In operation the lens carrying tube may be lowered away from the lamp house by pressing on the member 88. An object such as a negative may be disposed on the transparent member of the support 114 and the support inserted between the tube 86 and lamp house 2. As the tube 86 is allowed to move upwardly and it is so moved by springs 96, when pressure is released from member 88, the object such as a negative is pressed more or less by the glass 118 against the underside of the condenser lens 16 and held thereagainst. With the object thus placed the lamp house may be moved up or down, back and forth, or swung by swinging the entire structure including the bracket 40 relative to the easel. In this manner the object being projected is easily and readily located as desired on the easel and the member to receive the projected object is located in receiving position.

While I have described the invention in great detail and with respect to a preferred form thereof, it is not desired to be limited thereto since many changes and modifications may be made therein without departing from the spirit and scope of the invention. What it is desired to claim and secure by Letters Patent of the United States is:

1. A unitary projection apparatus comprising in combination, an easel, a guide along a face of said easel at one side thereof, a lower support having a part engaging the opposite face of said easel and a guide engaging member associated therewith, an upper bracket, a lamp house on said bracket, parallel link mechanism, and pivotal connections between the link mechanism and said support and bracket, all adapted and arranged whereby the support is guided for movements back and forth in a certain definite path along said one side of the easel and may oscillate in any position along its path of movement and the lamp house may move back and forth in planes parallel to the easel and towards and away from said easel.

2. A unitary projection apparatus comprising in combination, an easel, a guide member along the upper face and at one side thereof, a support having a part engaging the lower face of the easel at said one side, a block slidable on said guide member, a screw associated with said support acting on said block to clamp the support to said guide member and easel or permit said support to move in a certain definite path along said easel and oscillate in any position therealong, a bracket, a lamp house carried thereby, parallel link mechanism, and pivotal connections between said link mechanism, support and bracket.

3. A unitary projection apparatus comprising in combination, an easel, an elongated track guide along the upper face at one side of the easel, a support having a part slidably and oscillatably engaging the lower face of the easel at said one side, a block fitting on said track guide and slidable therealong, a screw in said support engaging said block, all adapted and arranged whereby the said support is movable back and forth in a certain definite path relative to said easel and oscillatable in any position along its path of movement, a bracket, a lamp house, parallel link mechanism, and pivotal connections between the said mechanism, support and bracket.

4. A unitary projection apparatus comprising in combination, an easel, a support, engageable guiding and clamping connections between one side of said easel and said support to facilitate sliding movements of the support in a certain definite path relative to said easel and oscillation thereof in any position along its path of movement, a bracket, a lamp house on said bracket, parallel link mechanism, and pivotal connections between said mechanism, support and bracket, all adapted and arranged whereby the lamp house may be moved in planes parallel to the easel and towards and away therefrom.

HINSDALE SMITH.